March 10, 1964  R. O. ISENBARGER  3,123,902
SEAL INSTALLATION TOOL
Filed Jan. 23, 1961  2 Sheets-Sheet 1
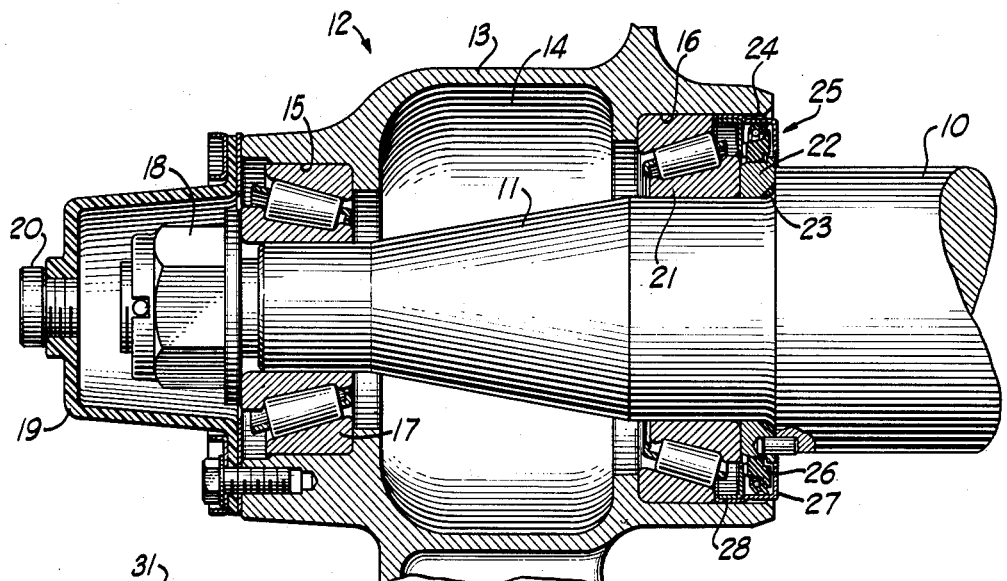
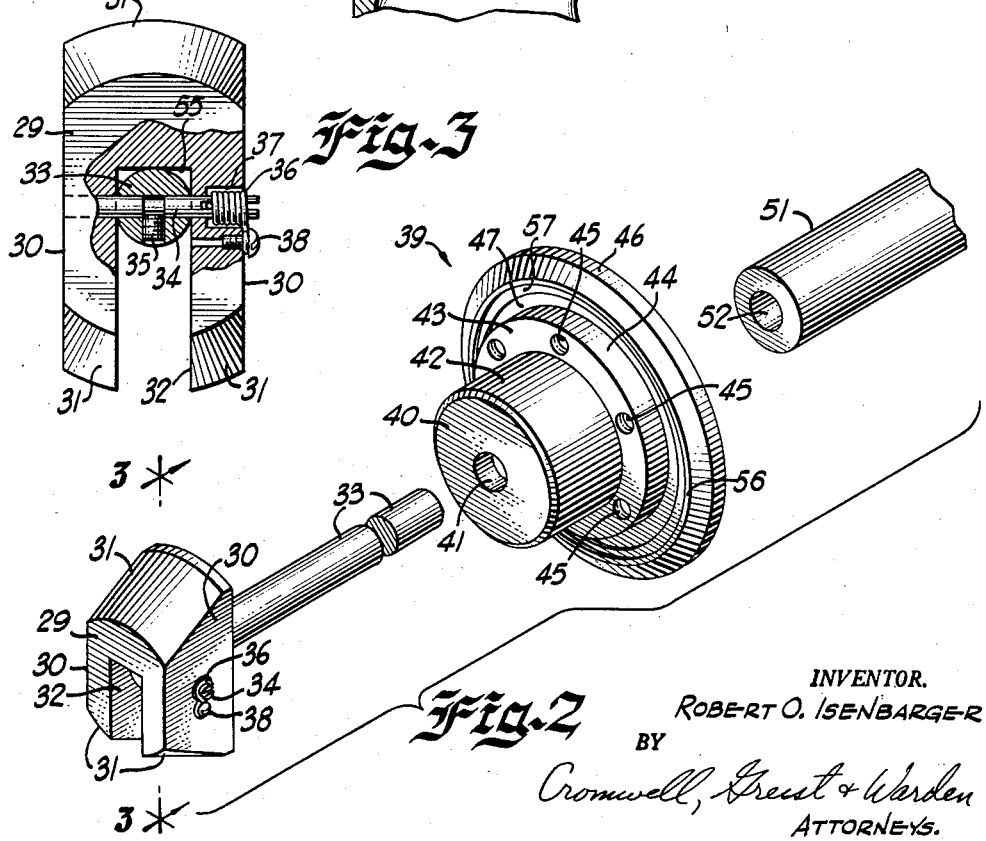
INVENTOR.
ROBERT O. ISENBARGER
BY
Cromwell, Greist & Warden
ATTORNEYS.

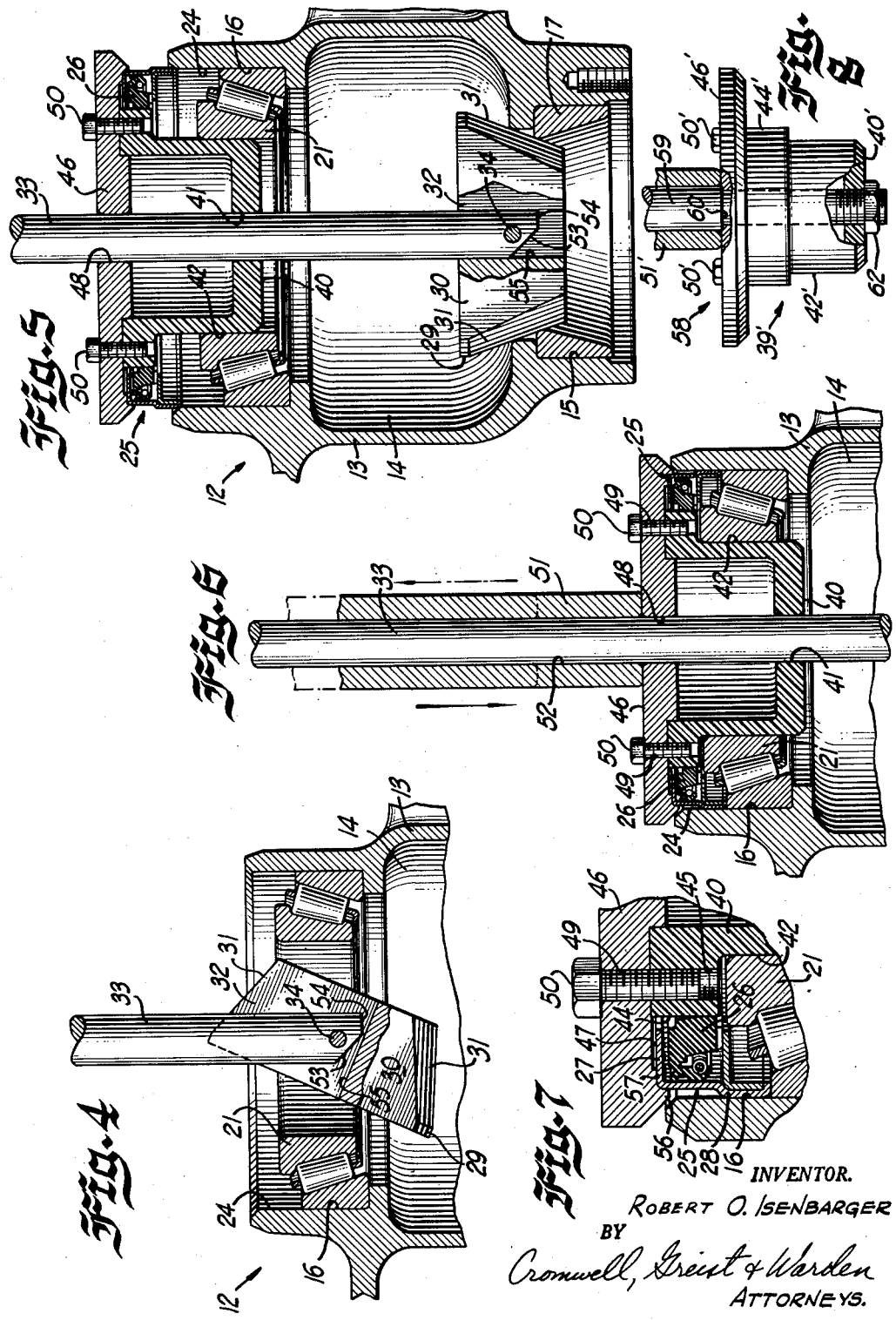

United States Patent Office 3,123,902
Patented Mar. 10, 1964

3,123,902
SEAL INSTALLATION TOOL
Robert O. Isenbarger, Chicago, Ill., assignor to Chicago Rawhide Manufacturing Company, Chicago, Ill., a corporation of Illinois
Filed Jan. 23, 1961, Ser. No. 84,187
5 Claims. (Cl. 29—271)

The present invention relates to a new and improved seal installation tool particularly adapted for use in installing an annular axle seal in a wheel housing.

Axle or spindle seals installed in wheels of the type used on large trailers and semi-trailers must be capable of efficient long-life operation under adverse conditions. Care must be taken in installing a wheel seal as the same is often the only means by which loss of oil and leakage on trailer brake drums is prevented. The need for seal replacement often occurs where the best seal installation facilities are not available. Furthermore, the mechanics making such installations are more often not adequately skilled and a defective installation including damage to the seal may result. Added to these problems is that of the seal installation being partially blind as the hub of the wheel in which the seal is received is depressed below the plane of the edge of the tires which are on the wheel at the time of seal installation.

It is an object of the present invention to provide a new and improved, uncomplicated and efficient seal installation tool which is particularly adapted for use in installing a seal in the wheels of large trailers and semi-trailers.

Another object of the invention is to provide a seal installation tool which produces a quicker, easier and more accurate seal installation than known types of tools while greatly reducing the danger of damage to the seal undergoing installation.

Still another object is to provide a seal installation tool which may be used by unskilled mechanics with maximum efficiency, which is completely portable and of a type suited for inclusion in a portable kit forming a part of trailer equipment, the tool being of a nature to be adapted for use in a manner to compensate for blind seal installation while including features eliminating or at least substantially minimizing the possibility of seal damage during installation.

Other objects not specifically set forth will become apparent from the following detailed description of the present invention made in conjunction with the accompanying drawings wherein:

FIG. 1 is a fragmentary section of a known type of trailer wheel assembly illustrating seal operative positioning therein;

FIG. 2 is a fragmentary perspective in exploded form of the seal installation tool of the present invention;

FIG. 3 is an enlarged end view of the plug end portion of the tool as viewed along line 3—3 in FIG. 2 and with portions thereof broken away;

FIG. 4 is a fragmentary section of the plug end of the tool and a portion of a wheel hub illustrating initial insertion of the tool into the hub;

FIG. 5 is a fragmentary section of the tool and hub portion of a wheel illustrating final positioning of the tool and a seal carried thereby relative to the hub for seal installation therein;

FIG. 6 is a fragmentary section of portions of the tool and wheel hub illustrating operative use of the tool in installing a seal in the hub;

FIG. 7 is an enlarged fragmentary section of the seal carrying portion of the tool and seal receiving portion of the wheel hub to better illustrate the positioning of the seal on the tool and installation thereof by the tool in the wheel hub; and FIG. 8 is a fragmentary, partly sectioned view of a modified form of seal installation tool forming a part of the present invention.

A typical trailer wheel assembly is illustrated in FIG. 1. As is well known, such an assembly includes a fixed axle 10 having a spindle 11 forming a part thereof and about which a wheel 12 is received. The wheel 12 includes a hub 13 which internally thereof defines a lubricant housing 14 arranged between a pair of axially aligned, spaced bores 15 and 16. The bore 15 has mounted therein the roller bearing assembly which includes an outer race 17. This bearing assembly is engaged with the outer end of the spindle 11 with the wheel 12 being suitably locked on the axle 10 by a nut 18. A hub cap 19 suitably encloses the outer end of the bore 15 of the hub 13 and carries a removable filler plug 20 which upon removal permits lubricant filling of the housing 14. Lubricant in the housing 14 is maintained at a prescribed level which is readily observable through the hub cap 19 as this cap is made of transparent plastic material.

The bore 16 has mounted therein a roller bearing assembly which includes an inner race 21 engaged with the spindle 11. A spindle collar 22 is positioned between the inner race 21 and an enlarged shoulder portion of the axle 10 with an O-ring 23 being suitably retained therebetween. The bore 16 outwardly of the roller bearing assembly is provided with an annular seal mounting area 24 in which a suitable seal assembly 25 is received. The seal assembly 25 may be of any suitable type with the particular assembly illustrated including a rubber or rubber-like sealing member 26 received in a metallic retainer 27 which is provided with an axially projecting press fit portion 28 in engagement with the seal mounting surface 24 of the bore 16. The outer end of the press fit portion 28 is in abutment with a portion of the bearing assembly mounted in the bore 16. The seal 25 illustrated is an external lip-type seal having a flexible spring held lip portion maintained in running engagement with an adjacent inner surface of the retainer 27. The sealing member 26 is mounted in fixed sealing engagement about the collar 22 and the retainer 27 rotates with the wheel 12.

FIG. 2 illustrates the seal installation tool of the present invention. This tool includes a plug-like member 29 which is formed with oppositely positioned flat side surface portions 30 and oppositely positioned cone-shaped side surface portions 31. One of the cone-shaped surface portions 31 is centrally grooved as indicated by the reference numeral 32 to provide for the receiving of the end of a rod 33 centrally in the plug 29. As best shown in FIG. 3, the rod 33 just inwardly of the end thereof received within the groove 32 of the plug 29 is provided with a transversely projecting pin 34 which is locked in place by a set screw 35 and along opposite projecting ends is suitably journaled in the plug 29. This arrangement permits tilting of the plug 29 relative to the rod 33. One projecting end of the pin 34 is bifurcated and has locked therein one end of a coil spring 36 which is wrapped around the outer portion of the pin 34 and received in a groove 37 in a flat side surface portion 30 of the plug 29. The remaining end of the coil spring 36 is secured to a lock screw 38 inserted in a suitable aperture in the flat side surface portion 30 of the plug 21 adjacent the recess 37. In this manner the opposite ends of the coil spring 36 are anchored to the pin 34 and plug 29. The spring 36 is arranged to urge the plug 29 into right angled position relative to the rod 33 as shown in FIGS. 2 and 3 but permits tilting of the plug 29 relative to the rod 33 for a purpose to be described.

As further shown in FIG. 2, the seal installation tool includes a seal carrying and centering assembly generally designated by the numeral 39. This assembly is formed from a seal locator member 40 which may be fabricated from molded plastic material and which is provided with a central aperture 41 through which the rod 33 is slidingly received. The seal locator member includes an annular surface portion 42 of reduced diameter which terminates at the rear thereof in an annular rim-like base 43. The base 43 is provided with an outer annular seal mounting surface 44 and has formed therein a plurality of circumferentially spaced apertures 45.

The assembly 39 further includes a separate striker plate 46 which along the radial forward face thereof has a circumferential recess 47 in which the base rim 44 of the seal locator member 40 is received. As shown in FIGS. 5 and 6, the striker plate 46 which is preferably formed from metallic material is provided with a central aperture 48 through which the rod 33 is slidably received and a plurality of circumferentially spaced apertures 49 aligned with the apertures 45 of the seal locator member 40. Suitable fastening means 50 which may be threaded fasteners or rivets are received through the aligned apertures 45 and 49 and secure the striker plate 46 to the seal locator member 40.

As shown in FIG. 2 the seal installation tool assembly is completed by the provision of a striker means 51 which is in the form of an elongated sleeve of relatively heavy metallic material. The striker means 51 is provided with a central aperture 52 through which the rod 33 is received with adequate clearance being provided to permit free falling of the striker 51 along the rod 33 into end abutment with the striker plate 46.

The sequence of steps of operational use of the seal installation tool is shown in FIGS. 4–7. As illustrated in these figures, the wheel 12 has been removed from the spindle 11, has been placed flat on a horizontal surface with the bore 15 positioned down and the bore 16 positioned up, the seal mounting surface 24 of the bore 16 has been cleaned for new seal insertion, and the roller bearing assembly mounted in the bore 15 has been removed therefrom with the exception of the outer race 17 (FIG. 5).

The rod 33 carrying the plug 29 is aligned with the bore 16 of the wheel and the plug 29 is tilted sufficiently against the strength of the spring 36 to permit insertion thereof through the inner race 21 of the bearing assembly mounted in the bore 16. FIG. 4 illustrates tilting of the plug 29 to a suitable position and it will be noted that by providing this plug with the flat sided surface portions 30, the same is readily inserted through the bearing assembly in the bore 16. FIG. 4 best illustrates the end of the rod 33 in attachment with the plug 29 and it will be noted that this end is provided with a flat angled surface portion 53 which permits adequate tilting of the plug relative to the rod 33 without abutment between the end of the rod and a side wall of the groove 32. The end of the rod 33 is provided with a flat end surface portion 54 which will ultimately abut an adjacent surface of the groove 32 thus providing a means preventing complete rotation of the plug against the action of the spring 36 relative to the rod 33. It should also be noted that the outer curved surface portion of the rod 33 adjacent the flat end surface portion 54 will abut the innermost end surface 55 (see FIG. 3) of the groove 32 when the plug is urged by the spring 36 into right angled position relative to the rod 33. This feature provides a stop means to limit spring urged movement of the plug beyond right angled relation relative to the rod 33 when the plug is released.

FIG. 5 illustrates utilization of the plug 29 in obtaining primary alignment of the tool in the hub 13 of the wheel for efficient seal installation. The rod 33 is inserted through the housing 14 to an extent that the cone-shaped side surface portions 31 thereof engage surfaces adjacent the bore 15. As illustrated, the cone-shaped side surface portions 31 engage the outer race 17 of the bearing assembly of the bore 15 which is retained in the hub 13 during seal installation. The cone-shaped side surface portions 31 function to automatically center the innermost end of the tool in the hub 13 and limit the extent to which the tool may be introduced into the hub 13.

Still referring to FIG. 5, the seal carrying assembly 39 is slidingly advanced along the rod 33 to an extent that the annular surface portion 42 of the seal locator member 40 is received in the inner race 21 of the bearing assembly mounted in the bore 16. This arrangement provides for secondary and final centering of the tool in the housing 14 to assure proper alignment of the seal assembly 25 with the seal mounting surface 24 of the bore 16.

FIG. 6 illustrates operational use of the tool in press fitting the seal assembly 25 into the seal mounting portion 24 of the bore 16. The striker sleeve 51 is raised along the rod 33 in a direction away from the striker plate 46 and is then released to fall against the back surface of the striker plate 46 as guided by the rod 33. The striker sleeve 51 is used in the manner of a hammer but by its nature provides for controlled delivery of seal installational forces in a manner eliminating possibility of seal damage during installation. It is best to make use of the striker sleeve 51 to an extent that initial installational forces are of relatively small magnitude to provide for proper starting of the seal into the bore 16. Striking is repeated with sufficient force to drive the seal into the bore and is discontinued when the seal bottoms against the bearing cup.

As best shown in FIG. 7, the axially exposed portion of the recess 47 of the striker plate 46 is defined by a forwardly projecting rim 56 internally of which the seal assembly 25 is received. To provide for proper mounting of the seal assembly on the seal carrying assembly 39, it is preferred that there is a slight press fit between the inner surface of the rim 56 and the retainer 27 of the seal assembly. A raised shoulder 57 is formed in the recess 47 radially inwardly of the rim 56 and its radial face abuts the rear radial face of the seal assembly 25. This arrangement provides for transmission of seal installation forces to the seal assembly adjacent the outer periphery thereof thus delivering the driving forces directly along the strongest portion of the retainer 27 of the seal assembly including the press fit rim 28. In this manner there is no possibility of seal damage or distortion during installation thereof and a good press fit is obtained with the minimum of force application.

A modified form of seal installation tool 58 is illustrated in FIG. 8. This tool includes a number of the same parts described above and these parts are identified by corresponding primed reference numerals. The main difference lies in the fact that the tool 58 is not provided with a plug-like member 29. This tool includes a rod 59 formed with an annular shoulder 60 which abuts the rear face of the striker plate 46′. The rod 59 is further provided with an integral projecting rod end portion 61 of smaller diameter than the rod 59 and on which is mounted the seal carrying assembly 39′. This assembly is fixed on the rod end portion 61 by a nut 62 threadedly received on the outer end of the rod end portion 61.

The tool 58 in use is inserted into the inner race 21 of the bore 16 of the wheel 12 and by this means alone the seal carried thereby is centered relative to the bore 16. Upon proper alignment and location of a seal carried by the tool 58 relative to the bore 16, the striker sleeve 51′ is operated along the rod 59 in the same manner as described above to press fit a seal into the bore 16.

It will be appreciated that the seal installation tool of the present invention is of uncomplicated design and can be used by an unskilled person in efficiently installing a seal assembly in a wheel hub. The provision of a striker sleeve of known weight and controlled guided use provides for efficient, non-damaging force application to a seal during installation thereof. Thus experience on the part of a mechanic with regard to the delivery of proper force to a seal installation tool, such as by hammer or mallet, is unecessary. The tool may readily form a part of a seal installation kit with which a trailer may be equipped for use by an unskilled person whenever necessary during operation of the trailer.

Obviously certain modifications and variations of the invention as hereinbefore set forth may be made without departing from the spirit and scope thereof, and therefore only such limitations should be imposed as are indicated in the appended claims.

I claim:

1. A tool for use in installing an annular seal in a seal mounting portion of a housing adapted to receive therein a shaft-type member, said tool comprising a seal carrying means provided with an outer annular portion including a radial surface and an axial surface projecting forwardly from said radial surface and adapted to mount a seal thereon for insertion into a housing in alignment with the seal mounting portion thereof for pressed installation thereagainst, a rod-like member extending rearwardly of said seal carrying means and of said radial surface, and striker means carried by said rod-like member and axially movable relative thereto and to said seal carrying means, said striker means including a sleeve portion arranged for abutment with a surface forming a part of said tool and which is fixed relative to said carrying means to transmit seal installation forces generated by said striker means through said seal carrying means and the radial surface thereof to the seal carried thereby, said radial surface of said seal carrying means being circumferentially recessed in an axial direction spaced inwardly of the outer periphery thereof, said recess being dimensioned to snugly receive a rear portion of a seal therein to position and hold the same in forwardly projecting fixed relation about said axial surface, the sleeve portion of said striker means and said recess being in concentric alignment.

2. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal carrying means provided with an outer annular surface having a rear portion thereof adapted to mount a seal thereon for installation in said first bore and a forward portion projecting beyond the seal mounting rear portion, rod-like means extending forwardly and rearwardly of said seal carrying means, the forward extension of said rod-like means having axially tapered plug-like means at the end thereof shaped and located to abut the bearing means of the bore spaced from said first bore to axially align a seal carried by said seal carrying means relative to said first bore, the forward portion of the outer annular surface of said seal carrying means being dimensioned for insertion within the bearing means of said first bore and for centering thereby, and striker means carried by the rearward extension of said rod-like means and axially movable relative thereto and to said seal carrying means, said striker means being arranged for abutment with a surface forming a part of said tool and which is fixed relative to said seal carrying means to transmit seal installation forces generated by said striker means through said seal carrying means to the seal carried thereby.

3. The tool of claim 2 wherein said plug-like means is formed with at least one flat side surface portion joined with a cone-shaped side surface portion, said cone-shaped portion providing for centering of said plug-like means in a bearing means, said plug-like means being mounted for tilting on said rod-like means with said flat side portion permitting being shaped and positioned to permit movement of said rod-like means through the bearing means of said first bore in the tilted position of said plug-like means, and spring return means operative between said rod-like means and plug-like means to urge the latter into operative position.

4. The tool of claim 3 wherein said recess includes a circumferentially arranged and axially projecting shoulder means therein located to engage a seal adjacent the outer periphery thereof to selectively transmit installation forces thereto.

5. The tool of claim 3 wherein said rod-like member also extends forwardly of said seal carrying means and said seal carrying means is axially movable on said rod-like member, the forward extension of said rod-like member having centering means thereon for engagement with a part of a housing spaced beyond the seal mounting portion thereof.

References Cited in the file of this patent
UNITED STATES PATENTS

| | | |
|---|---|---|
| 1,825,873 | Kulp et al. | Oct. 6, 1931 |
| 1,882,689 | Albertson | Oct. 18, 1932 |
| 1,905,879 | Albertson | Apr. 25, 1933 |
| 2,421,324 | Graham | May 27, 1947 |
| 2,441,981 | Stelzer | May 25, 1948 |
| 2,779,089 | Allen | Jan. 29, 1957 |
| 2,860,535 | Fowler | Nov. 18, 1958 |

UNITED STATES PATENT OFFICE
CERTIFICATE OF CORRECTION

Patent No. 3,123,902                      March 10, 1964

Robert O. Isenbarger

It is hereby certified that error appears in the above numbered patent requiring correction and that the said Letters Patent should read as corrected below.

Column 6, line 21, strike out "permitting".

Signed and sealed this 18th day of August 1964.

(SEAL)
Attest:

ERNEST W. SWIDER
Attesting Officer

EDWARD J. BRENNER
Commissioner of Patents